(12) United States Patent
Spinelli et al.

(10) Patent No.: US 6,551,159 B1
(45) Date of Patent: Apr. 22, 2003

(54) AUTOMOTIVE UNDERWATER EVACUATION SYSTEM

(76) Inventors: Lou L. Spinelli, 2008 NE. 3rd Ter., Wilton Manors, FL (US) 33305; Lou Spinelli, 348 SW. 2nd Ave., Dania Beach, FL (US) 33004

( * ) Notice: Subject to any disclaimer, the term of this patent is extended or adjusted under 35 U.S.C. 154(b) by 0 days.

(21) Appl. No.: 10/034,062

(22) Filed: Dec. 28, 2001

(51) Int. Cl.[7] ................................................. B63C 9/00
(52) U.S. Cl. ............................ 441/80; 441/88; 441/89; 441/92
(58) Field of Search .......................... 441/80, 88, 89, 441/90, 92–97

(56) References Cited

U.S. PATENT DOCUMENTS

| | | | |
|---|---|---|---|
| 4,560,356 A | * 12/1985 | Burr | 222/5 |
| 5,199,374 A | 4/1993 | Blanchette | |
| 5,234,144 A | * 8/1993 | Iler | 220/375 |
| 5,239,989 A | * 8/1993 | Chen | 128/200.24 |
| 5,374,212 A | 12/1994 | Lall | |
| 5,536,191 A | 7/1996 | Lin | |
| 5,642,567 A | 7/1997 | Lin | |
| 5,657,543 A | 8/1997 | Collins | |
| 5,738,557 A | 4/1998 | Biesecker | |
| 5,791,056 A | 8/1998 | Messina | |
| 5,839,931 A | * 11/1998 | Shieh | 441/30 |
| 5,952,916 A | 9/1999 | Yamabe | |
| 6,004,178 A | 12/1999 | Liu et al. | |

* cited by examiner

Primary Examiner—Sherman Basinger
(74) Attorney, Agent, or Firm—Oltman, Flynn & Kubler

(57) ABSTRACT

A vehicle evacuation system for aiding the escape of a person trapped in a motor vehicle having a vehicle seat, a vehicle seat belt and vehicle windows, which has entered a body of water, includes a cutting tool for cutting through a vehicle seat belt; a glass breaking tool for breaking a glass vehicle window for escape; a combined compressed breathable air tank and mouthpiece; an inflatable buoy bag and compressed gas cartridge for lifting the person to the water surface; a distress and position indicating signal generating mechanism for sending an alarm signal to a receiving station, the alarm signal being trackable by a tracking device; and an element unification structure for holding elements of the system together in a readily accessible configuration prior to and during use.

19 Claims, 3 Drawing Sheets

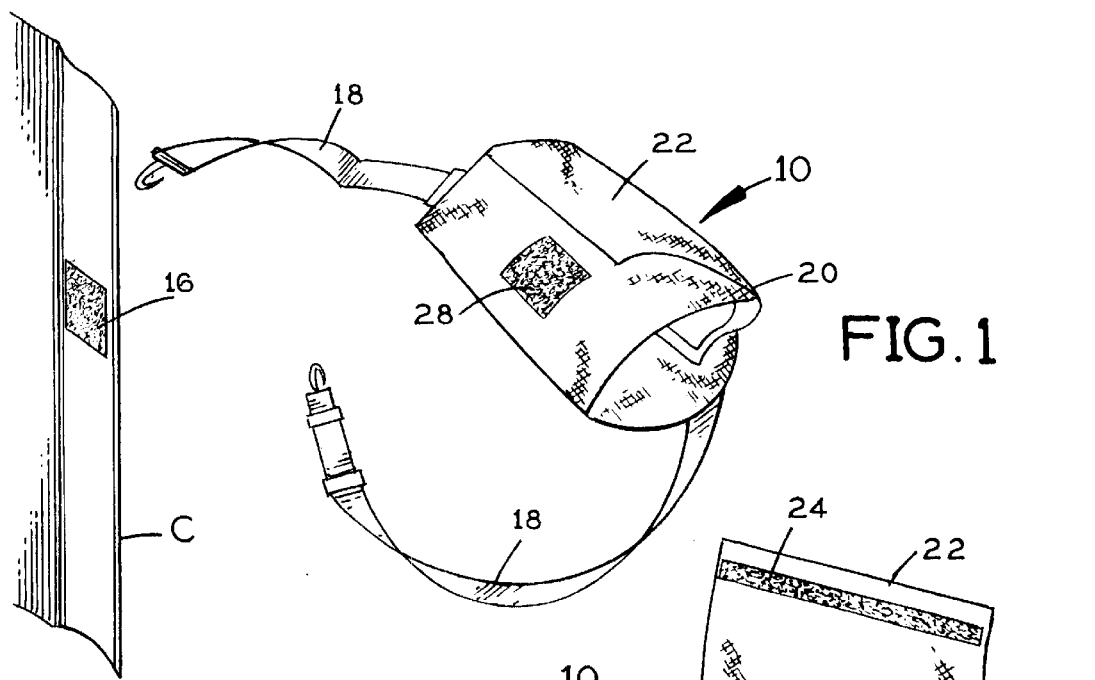
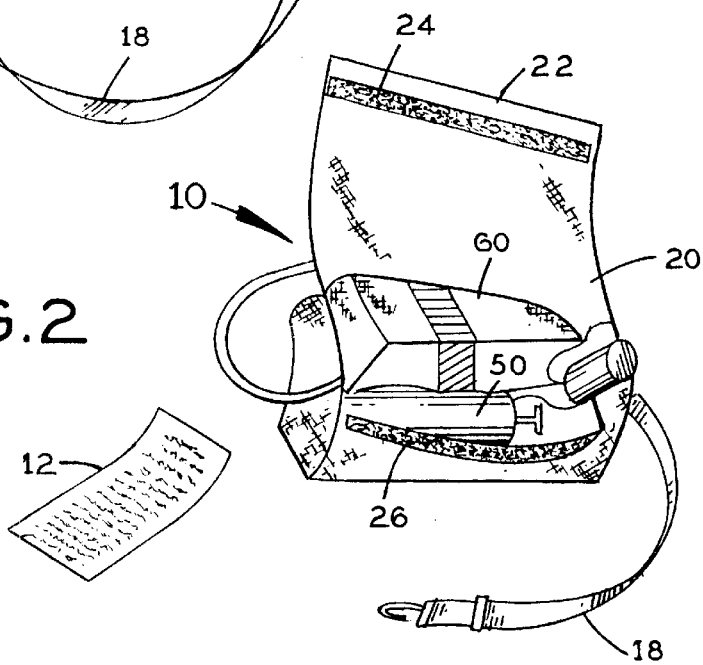
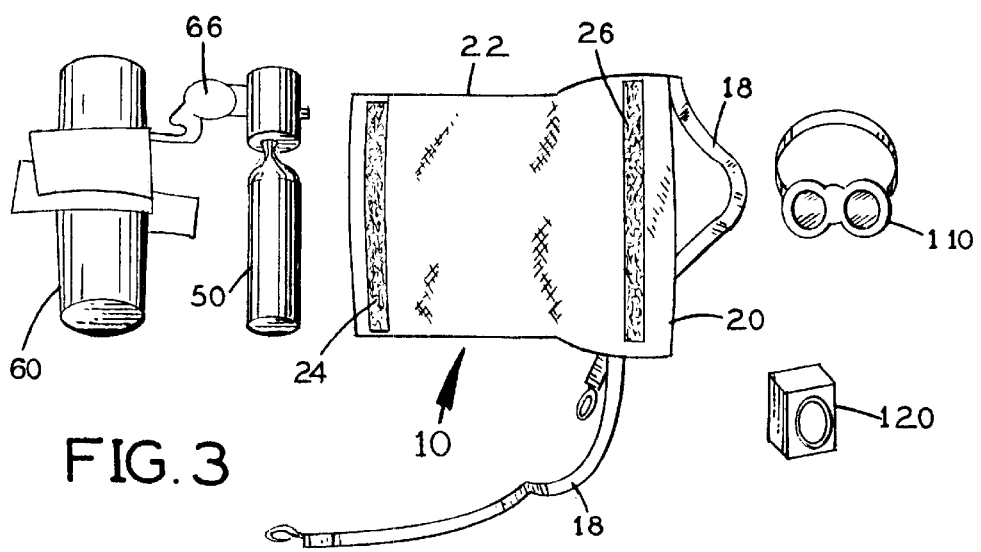

AUTOMOTIVE UNDERWATER EVACUATION SYSTEM

BACKGROUND OF THE INVENTION

1. Field of the Invention

The present invention relates generally to the field of safety equipment for vehicles. More specifically the present invention relates to a vehicle evacuation system which provides a series of interdependent steps set forth in a system instruction sheet and provides an apparatus including system elements for performing these steps for escape from a cabin of a motor vehicle which has strayed from the road into a body of water and is sinking or has already sunk. The system includes element unification structures such as interconnection cords and a containment bag for holding the system elements together in a readily accessible configuration prior to and during use; a cutting tool for cutting through a seat belt; a glass breaking tool for breaking the glass in a vehicle window through which to escape; a combined compressed breathable air tank, regulator and mouthpiece from which a person receives breathable air during vehicle escape; a combined buoy bag, compressed gas cartridge and means for release and delivery of the compressed gas from the cartridge into the buoy bag for inflating the buoy bag and lifting a disoriented escaping person to the surface of the body of water, the buoy bag preferably including an attached wrist strap for fitting around and thereby engaging a wrist of an escaping person so that the inflated buoy bag does not slip away from him or her; and a distress and position indicating signal generating means for sending an electromagnetic alarm signal to a receiving station, the signal being trackable by a conventional tracking means such as a direction finder or a global positioning system for emergency workers to follow and rapidly locate a distressed person. The inclusion of all of these cooperative elements is necessary for performance of all steps needed for assured escape and timely rescue. A person in a submerged vehicle could drown for absence of any missing element, such as from inability to free himself or herself from seat belts, for being too disoriented to swim in the direction of the water surface, for inability to swim, or from prolonged exposure which in some regions would include hypothermia for lack of any means to signal and give locating information to remote rescue workers. It is further preferred that the system include a pair of goggles to aid the escaping person in seeing underwater and include a waterproof strobe light within enclosed power source to draw the attention of onlookers and searchers.

2. Description of the Prior Art

In recent years increasing numbers of people have drowned in automobiles which have strayed off roads into canals and lakes, most of whom were not impared and could have been a saved with access to the proper tools. This tragic trend has been documented in broadcast and print media, such as *Canal deaths defy easy solution/80 Crashes have claimed* 99 lives from 1996–2000, South Florida Sun-Sentinel, Section A, Nov. 18, 2001:

"The Ellis children were among 99 people in Broward, Palm Beach and Miami-Dade counties from 1996 to 2000 who died after vehicles plunged into canals or other bodies of water. The Sun-Sentinel examined 80 fatal crash records during that five-year period that involved vehicles plunging into water.

"Most of the crashes occurred in good weather. Few of the vehicles had defects. In the majority of cases, age and driving experience did not appear to be factors, and drivers were not drinking or under the influence of drugs." Another such newspaper article is *Drivers have ultimate responsibility for averting tragedy/Barriers help but safety experts say motorists must protect themselves*, South Florida Sun-Sentinel, Section A, Nov. 19, 2001.

A number of devices have been provided for aiding in survival and escape from capsized ships and submerged automobiles. Some of these devices have been helpful, but only up to a certain point. All have lacked means for completely effecting an escape and rescue. And, unfortunately, there is no such thing as a partial escape or a partial rescue. If the device is insufficient to permit complete escape and rescue, the result is the same as if no device had been present at all.

One such prior device is that of Blanchette, U.S. Pat. No. 5,199,374, issued on Apr. 6, 1993, for an aerial location self-actuating emergency sea surface marker for capsized vessels. Blanchette includes a buoy stored in a canister secured to a vessel which may be either a water craft or an air craft. The buoy has automatic inflation means from a compressed gas container which is automatically actuated by contact with water or by pressure resulting from capsizing of the vessel. Seams of the canister are constructed to break so that the canister opens or explodes upon actuation and releases an inflating bladder. A portion of the canister incorporates a feed line on a rotating spool connecting the bladder to the capsized vessel. Blanchette does not provide means for escaping from a submerged motor vehicle, does not provide a suitable system containment means for storage in or deployment from a motor vehicle (an exploding canister would not be suitable) and does not appear to provide a homing distress signal for alerting authorities of a person in distress.

Lall, U.S. Pat. No. 5,374,212, issued on Dec. 20, 1994, teaches a personal floatation equipment device. Lall is attachable to a portion of a wearer body such as a wrist and includes a housing containing an inflatable bag with a bag inlet, a pressurized gas chamber connected to the bag inlet and a valve controlling gas flow from the gas chamber into the bag. Manually opening a cover on the housing releases the inflatable bag and simultaneously opens the valve to release the compressed gas into and inflate the bag. Another, similar, device is that of Liu, et al., U.S. Pat. No. 6,004,178, issued on Dec. 21, 1999, revealing a compressed gas inflated life preserver which is connected to the body of a user such as to the waist. For both Lall and Liu, et al., the problems of Blanchette are again presented.

Lin, U.S. Pat. No. 5,536,191, issued on Jul. 16, 1996, reveals what is termed a life-saving assistance drive. Lin includes an electroluminescent element mounted on a netting harness fitted around an inflatable balloon. These elements are packed into a satchel attached to a securing belt. Lin once again presents the problems of Blanchette. The lighting element to help locate a victim but would only be useful for a short visible range. No remote signalling means apparently is provided.

Lin, U.S. Pat. No. 5,642,567, issued on Jul. 1, 1997, discloses an emergency escape apparatus for use in a car. Lin includes an apparatus handle having a striking member at one end for breaking a vehicle window, a retractable needle for puncturing an inflated air bag, a seat belt cutting blade recessed within a notch in the handle and a whistle for signalling nearby persons. Lin might free a person from a submerged vehicle, but provides no help for a person who is disoriented due to night time darkness, silted water or concussion, provides no floatation device to help the non-swimmer, and provides no long range signaling or locating means.

Collins, U.S. Pat. No. 5,657,543, issued on Aug. 19, 1997, teaches an emergency tool having the general configuration of a folding pocket knife. Collins includes a handle member containing a trigger-operated, spring-loaded glass breaking impact element, a folding blade for cutting seat belts and a prying structure for prying away objects in the vehicle. The problems of Lin '567 are again presented.

Biesecker, U.S. Pat. No. 5,738,557, issued on Apr. 14, 1998, reveals a pocket-sized, emergency floatation device. Biesecker includes a carrying case and a clip connected to the case with a cord for anchoring the case to a shirt pocket or to a belt, the case containing an inflatable diamond-shaped collar for fitting around the neck of a person to hold his or her head above water, and means for inflating the collar. Biesecker presents the problems of Lall.

Messina, U.S. Pat. No. 5,791,056, issued on Aug. 11, 1998, discloses an emergency glass breaking tool. The tool includes an impact element mounted on a spring-loaded plunger contained within a hollow cylindrical housing. A suction cup may releasibly connect the tool to a window to be broken. The problems of Lin '567 are again presented.

Yamabe, U.S. Pat. No. 5,952,916, issued on Sep. 14, 1999, teaches a hammer-equipped emergency signal device. Yamabe includes an elongate body with a grip and a device head at one end, a light bulb inside a chamber within the main body for radiating light through a glass lens at the device head, and a window breaking impact element attached to the device head. Problems with Yamabe are that no seat belt cutting means, floatation means or remote signalling means are provided.

It is thus an object of the present invention to provide a vehicle evacuation system which includes mechanical and electronic means for executing each step necessary for escaping from a submerged vehicle, for finding the surface and remaining afloat and for remotely signalling emergency response agencies of distress and location, and thus is made up of elements which synergistically cooperate to provide a life-saving result which none of the elements could reliably accomplish individually.

It is another object of the present invention to provide such a vehicle evacuation system which is structurally unified for compact storage, and cooperatively configured for rapid and reliable access and for ready manual accessibility.

It is still another object of the present invention to provide such a vehicle evacuation system which is light in weight and is easily deployed.

It is finally an object of the present invention to provide such a vehicle evacuation system which is inexpensive to manufacture.

SUMMARY OF THE INVENTION

The present invention accomplishes the above-stated objectives, as well as others, as may be determined by a fair reading and interpretation of the entire specification.

A vehicle evacuation system is provided for aiding the escape of a person trapped in a cabin of a motor vehicle having a vehicle seat, a vehicle seat belt and vehicle windows, which has entered a body of water, the system including a cutting tool for cutting through a vehicle seat belt; a glass breaking tool for breaking a glass vehicle window to create an opening through which to escape; a combined compressed breathable air tank and mouthpiece for delivering breathable air to the person during escape from the vehicle; a combined buoy bag, compressed gas cartridge and mechanism for release and delivery of compressed gas from the compressed gas cartridge into the buoy bag for lifting the person to the surface of the body of water, the buoy bag including an attached wrist strap for fitting around and thereby engaging a wrist of the person; a distress and position indicating signal generating mechanism for sending an alarm signal to a receiving station, the alarm signal being trackable by a tracking device for emergency workers to rapidly locate the person; and an element unification structure for holding elements of the system together in a readily accessible configuration prior to and during use.

The system preferably additionally includes goggles for aiding the person in seeing underwater. The system preferably still additionally includes a waterproof light and power source and light activation circuit for signalling nearby persons. The glass breaking tool preferably is a center punch. The cutting tool preferably is a line cutter, but alternatively may be a folding pocket knife. The element unification structure preferably includes at least one system element interconnection cord. The element unification structure preferably includes a system element containment bag.

A vehicle evacuation system is further provided for aiding the escape of a person trapped in a cabin of a motor vehicle having a vehicle seat, a vehicle seat belt and vehicle windows, which has entered a body of water, the system including a glass breaking tool for breaking a glass vehicle window to create an opening through which to escape; a combined compressed breathable air tank and mouthpiece for delivering breathable air to the person during escape from the vehicle; a combined buoy bag, compressed gas cartridge and a mechanism for release and delivery of compressed gas from the compressed gas cartridge into the buoy bag for lifting the person to the surface of the body of water; and includes an element unification structure for holding elements of the system together in a readily accessible configuration prior to use. The buoy bag preferably includes an attached body engaging strap for fitting around and thereby engaging part of the body of the person.

BRIEF DESCRIPTION OF THE DRAWINGS

Various other objects, advantages, and features of the invention will become apparent to those skilled in the art from the following discussion taken in conjunction with the following drawings, in which:

FIG. 1 is a perspective view of the system in closed configuration within its containment bag beside the base of a seat within a vehicle cabin to which the containment bag mounts.

FIG. 2 is a perspective view of the system of FIG. 1 in a partially open configuration, exposing several of the system elements such as the breathable air tank.

FIG. 3 is a top view of the further deployed system, with the containment bag open and the breathable air tank exposed and the buoy bag in its non-deployed, coiled configuration.

DETAILED DESCRIPTION OF THE PREFERRED EMBODIMENTS

Figure 4:
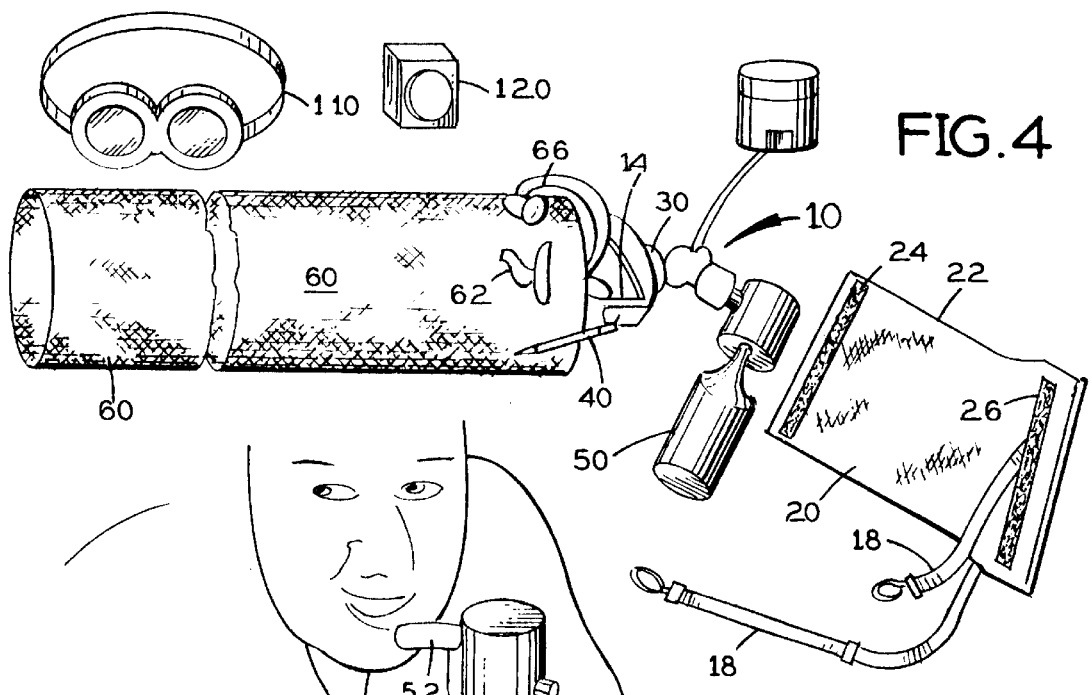
FIG. 4 is a top view of the system of FIG. 3, more fully deployed, with the buoy bag uncoiled for inflation.
Figure 6:
FIG. 6 is a front view of a person holding the preferred breathable air tank, with the tank mouthpiece oriented toward his mouth. Also shown are the preferred cutting tool in the form of a line cutter, and the preferred signal generating means.
Figure 5:
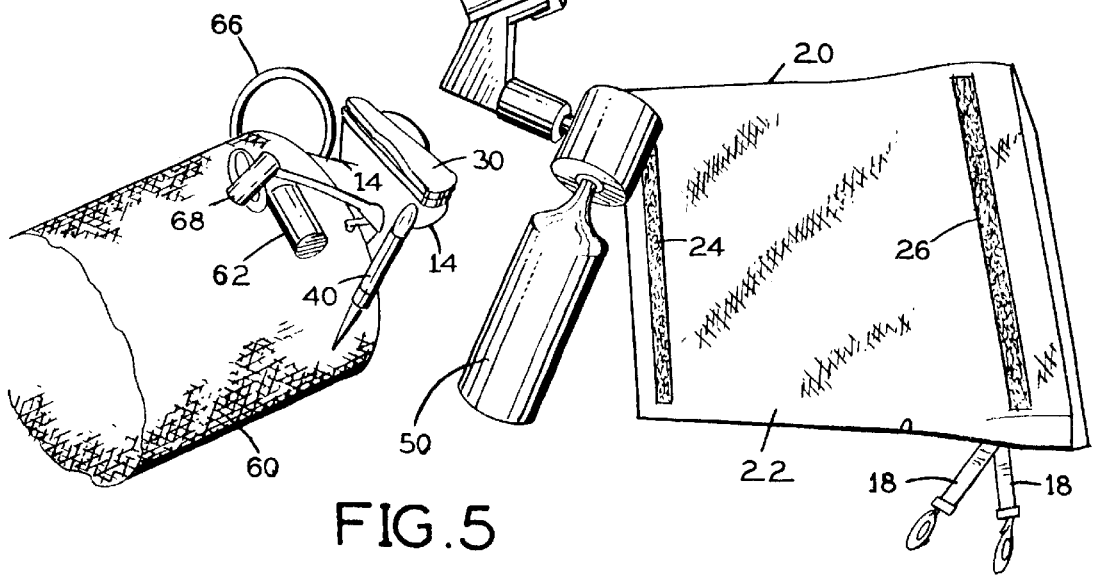
FIG. 5 is a partial, close-up view of the system as shown in FIG. 4.
Figure 7:
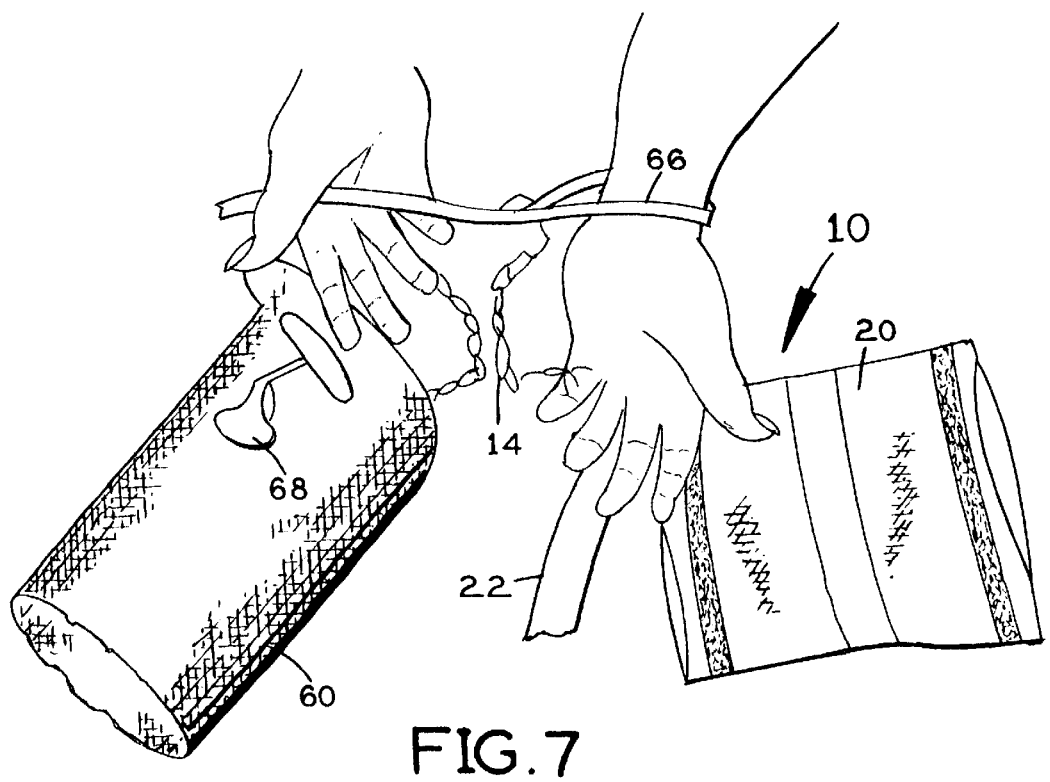
FIG. 7 is a close-up, partial view of the wrist strap connected to the buoy bag fitted around the wrist of a person for engaging the wrist and lifting the person to safety.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–8, a vehicle evacuation system 10 is disclosed which provides a series of steps set forth on a system instruction sheet 12 and provides a composite apparatus including system elements for performing these steps to escape from a closed cabin of a motor vehicle which has strayed from the road into a body of water and is sinking or already has sunk. System 10 includes element unification structures such as interconnection cords 14 and a containment bag 20 for holding the system 10 elements together in a readily accessible configuration prior to use; a cutting tool 30 for cutting through a seat belt; a glass breaking tool 40 for breaking the glass in a vehicle window through which to escape; a combined compressed breathable air tank 50, regulator and mouthpiece 52 from which a person receives breathable air during vehicle escape; a combined buoy bag 60, compressed gas cartridge 62 and valve and conduit means 64 for release and delivery of compressed gas from the cartridge 62 into the buoy bag 60 for inflating the buoy bag and lifting a disoriented person to the surface of the body of water, buoy bag 60 preferably including an attached wrist strap 66 for fitting around and thereby engaging a wrist of an escaping person so that the inflated buoy bag 60 does not slip away from them; and a distress and position indicating signal generating means 80 for sending an electromagnetic alarm signal to a receiving station, the signal being trackable by conventional tracking means, such as a direction finder or a global positioning system, for emergency workers to follow and rapidly locate the distressed person. The inclusion of all of these cooperative elements is necessary for the performance of all steps needed for assured escape and timely rescue. Thus a person in a submerged vehicle could drown for absence of any missing element, such as from inability to free himself or herself from seat belts, for being unable to swim in the direction of the water surface, for inability to swim, or from prolonged exposure which in some regions would include hypothermia for lack of any means to signal remote rescue workers. It is further preferred that system 10 include a pair of goggles 110 to aid the escaping person in seeing underwater, and include a waterproof strobe light 120 and enclosed contained power source with a light activation circuit to draw the attention of onlookers and searchers.

Figure 8:
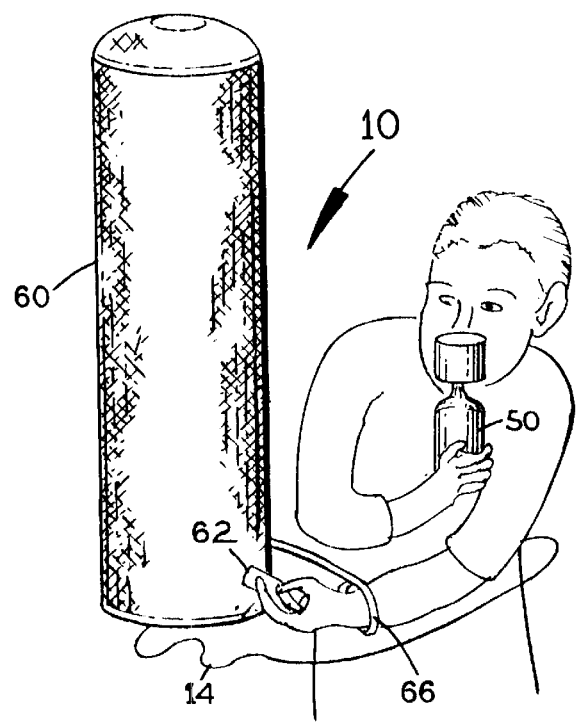
FIG. 8 is a front view of a person holding the breathable air tank mouthpiece to his mouth, the buoy bag strap and the buoy bag inflated and oriented upright, as it would be in the water. When the buoy bag reaches the surface of the body of water, it remains upright as shown because the narrow lower end is pulled downwardly into the water, so that the buoy bag is more readily visible to nearby persons.

The element unification structures preferably include nylon cords 14 which tie certain elements together, specifically the buoy bag 60, cutting tool 30 and glass breaking tool 40. The containment bag 20 preferably is formed of nylon and has an access cover flap 22 with a first hook and loop fastener strip 24 on its inward surface and a mating second hook and loop fastener strip 26 on the bag 20 forward surface. A shoulder strap 18 optionally extends from containment bag 20. Containment bag 20 further includes a system mounting hook and loop fastener means for connecting the bag 20 to a vehicle interior cabin structure, such as a pair of hook and loop fastener patches 16 and 28, the former secured to the cabin structure C and the ladder sewn to the bag 20 outer surface. The cabin structure C preferably is a portion of the vehicle front seat, near the vehicle floor on the driver side. The cutting tool 30 for cutting through a seat belt preferably is a line cutter such as that produced by OMS™, Leisure Pro, Ltd™, Catalog Number. OMSKLC, but alternatively may be a folding pocket knife, a box cutter, or other suitable instrument. See FIGS. 5 and 6. The glass breaking tool 40 for breaking the glass in a vehicle window preferably is a conventional center punch, preferably having a hardened tip. The combined compressed breathable air tank 50, regulator and mouthpiece 52 preferably are a single product known as SPARE AIR™ manufactured by Submersible Systems, Inc, which provides perhaps two or three minutes of breathable air. The combined buoy bag 60, compressed gas cartridge 62 and valve and conduit means 64 with activating pull cord and cord gripping tab 68 for release and delivery of compressed gas into the buoy bag 60 preferably is brightly colored for high visibility to nearby persons, and preferably is elongate to protrude upright from the water surface as shown in FIG. 8 for still greater visibility. The preferred buoy bag is an underwater marking and signal buoy bag inflated with inert, noncombustible gas such as $CO_2$, an example of which is the bag provided as part of MARKABUOY™ manufactured by DIRECT INNOVATIONS™ of Auckland, New Zealand. Examples of the distress and position indicating signal generating means 80 are a Miniature Personal Locator manufactured by EPIRBT™, Model 2004000, Catalog number ACR#276366, and the Magnum B Class B manufactured by EPIRB™, Model 185118, Catalog number ACR#2768. See FIG. 5.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A vehicle evacuation system for aiding the escape of a person trapped in a cabin of a motor vehicle having a vehicle seat, a vehicle seat belt and vehicle windows, which has entered a body of water, the system comprising:

system elements comprising a cutting tool for cutting through a vehicle seat belt; a glass breaking tool for breaking a glass vehicle window to create an opening through which to escape; a combined compressed breathable air tank and mouthpiece for delivering breathable air to the person during escape from the vehicle; a combined buoy bag, compressed gas cartridge and means for release and delivery of compressed gas from the compressed gas cartridge into the buoy bag for lifting the person to the surface of the body of water; a distress and position indicating signal generating means for sending an alarm signal to a receiving station, the alarm signal being trackable by tracking means for emergency workers to rapidly locate the person;

and interconnection means holding said system elements together in a readily accessible configuration prior to use.

2. The system of claim 1, additionally comprising goggles for aiding the person in seeing underwater.

3. The system of claim 1, additionally comprising a waterproof light and power source and light activation means for signalling nearby persons.

4. The system of claim 1, wherein said glass breaking tool is a center punch.

5. The system of claim 1, wherein said cutting tool is a folding pocket knife.

6. The system of claim 1, wherein said element unification structure comprises at least one system element interconnection cord.

7. The system of claim 1, additionally comprising a system element containment bag.

8. The system of claim 1, wherein said buoy bag comprises an attached wrist strap for fitting around and thereby engaging a wrist of the person.

9. A vehicle evacuation system for aiding the escape of a person trapped in a cabin of a motor vehicle having a vehicle seat, a vehicle seat belt and vehicle windows, which has entered a body of water, the system comprising:

system elements comprising a glass breaking tool for breaking a glass vehicle window to create an opening through which to escape; a combined compressed breathable air tank and mouthpiece for delivering breathable air to the person during escape from the vehicle; a combined buoy bag, compressed gas cartridge and means for release and delivery of compressed gas from the compressed gas cartridge into the buoy bag for lifting the person to the surface of the body of water;

and interconnection means holding said system elements together in a readily accessible configuration prior to use.

10. A vehicle evacuation system for aiding the escape of a person trapped in a cabin of a motor vehicle having a vehicle seat, a vehicle seat belt and vehicle windows, which has entered a body of water, the system comprising:

system elements comprising a glass breaking tool for breaking a glass vehicle window to create an opening through which to escape; a position indicating means; a combined buoy bag, compressed gas cartridge and means for release and delivery of compressed gas from the compressed gas cartridge into the buoy bag for lifting the person to the surface of the body of water;

and interconnection means holding said system elements together in a readily accessible configuration prior to use.

11. The system of claim 10, wherein said position indicating means comprises a light source.

12. The system of claim 10, wherein said position indicating means comprises a radio signal generating means.

13. A vehicle evacuation system for aiding the escape of a person trapped in a cabin of a motor vehicle having a vehicle seat, a vehicle seat belt and vehicle windows, which has entered a body of water, the system comprising:

a glass breaking tool for breaking a glass vehicle window to create an opening through which to escape;

and at least one other of the following system elements: a cutting tool for cutting through a vehicle seat belt; a combined compressed breathable air tank and mouthpiece for delivering breathable air to the person during escape from the vehicle; a combined buoy bag, compressed gas cartridge and means for release and delivery of compressed gas from the compressed gas cartridge into the buoy bag for lifting the person to the surface of the body of water; a distress and position indicating signal generating means for sending an alarm signal to a receiving station, the alarm signal being trackable by tracking means for emergency workers to rapidly locate the person; goggles for aiding the person in seeing underwater; and a waterproof light and power source and light activation means for signalling nearby persons;

and interconnection means holding the glass breaking tool and the at least one other system element together prior to use.

14. The system of claim 13, wherein said glass breaking tool is a center punch.

15. The system of claim 13, wherein said cutting tool is a folding pocket knife.

16. The system of claim 13, wherein said element unification structure comprises at least one system element interconnection cord.

17. The system of claim 13, additionally comprising a system element containment bag.

18. The system of claim 13, wherein said buoy bag comprises an attached wrist strap for fitting around and thereby engaging a wrist of the person.

19. A vehicle evacuation system for aiding the escape of a person trapped in a cabin of a motor vehicle having a vehicle seat, a vehicle seat belt and vehicle windows, which has entered a body of water, the system comprising:

a glass breaking tool for breaking a glass vehicle window to create an opening through which to escape;

and at least one other of the following system elements: a cutting tool for cutting through a vehicle seat belt; a combined compressed breathable air tank and mouthpiece for delivering breathable air to the person during escape from the vehicle; a combined buoy bag, compressed gas cartridge and means for release and delivery of compressed gas from the compressed gas cartridge into the buoy bag for lifting the person to the surface of the body of water; a distress and position indicating signal generating means for sending an alarm signal to a receiving station, the alarm signal being trackable by tracking means for emergency workers to rapidly locate the person; goggles for aiding the person in seeing underwater; and a waterproof light and power source and light activation means for signalling nearby persons;

and an interconnection cord holding the glass breaking tool and the at least one other system element together.

* * * * *